US012636793B2

(12) United States Patent
Panga

(10) Patent No.: US 12,636,793 B2
(45) Date of Patent: **\*May 26, 2026**

(54) OBJECT HANDLING APPARATUS

(71) Applicant: Google LLC, Mountain View, CA (US)

(72) Inventor: Avinash Panga, Woodinville, WA (US)

(73) Assignee: Google LLC, Mountain View, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 18/394,987

(22) Filed: Dec. 22, 2023

(65) Prior Publication Data

US 2024/0123626 A1 Apr. 18, 2024

Related U.S. Application Data

(63) Continuation of application No. 17/546,397, filed on Dec. 9, 2021, now Pat. No. 11,897,149.

(51) Int. Cl.
B25J 9/16 (2006.01)
B25J 11/00 (2006.01)
B25J 19/02 (2006.01)

(52) U.S. Cl.
CPC ........... B25J 9/1697 (2013.01); B25J 9/1679 (2013.01); B25J 11/008 (2013.01); B25J 19/023 (2013.01)

(58) Field of Classification Search
CPC ...... B25J 9/1697; B25J 9/1679; B25J 11/008; B25J 19/023; G11B 17/225; G11B 33/142; B65G 47/90
See application file for complete search history.

(56) References Cited

U.S. PATENT DOCUMENTS

| | | | |
|---|---|---|---|
| 9,785,911 B2 | 10/2017 | Galluzzo et al. | |
| 10,150,564 B2 | 12/2018 | Porat | |
| 11,897,149 B2 * | 2/2024 | Panga | B25J 9/1679 |
| 2005/0036231 A1 * | 2/2005 | Dickey | B25J 15/0206 360/92.1 |
| 2008/0089190 A1 * | 4/2008 | Green | G11B 17/225 |
| 2008/0319574 A1 | 12/2008 | Wilke | |
| 2015/0232273 A1 | 8/2015 | Jau et al. | |
| 2017/0084304 A1 | 3/2017 | Fiebrich-Kandler et al. | |

(Continued)

OTHER PUBLICATIONS

Extended European Search Report in European Appln. No. 22204157.6, mailed on May 4, 2023, 9 pages.

(Continued)

*Primary Examiner* — Robert T Nguyen
(74) *Attorney, Agent, or Firm* — Fish & Richardson P.C.

(57) ABSTRACT

An apparatus for handling electronic components such as hard disk drives. In one aspect, the apparatus includes a main body defining an interior space with an open front; a drive system that propels and positions the apparatus along horizontal surface; a fan system mounted within the interior space and positioned to blow air down into the interior space; a first gripper apparatus that engages an equipment drawer of an electronics rack; and a second gripper apparatus that grips and removes a target electronic component from a target position located within the equipment drawer, wherein at least a back surface of the main body includes perforations so that sufficient air flow generated by the fan system flows through the perforations to maintain cooling of electronic components in the equipment drawer when the equipment drawer is in the extracted position.

20 Claims, 9 Drawing Sheets

(56)     References Cited

U.S. PATENT DOCUMENTS

| 2017/0158430 | A1  | 6/2017  | Raizer |
| 2018/0313890 | A1  | 11/2018 | Wolff |
| 2020/0081439 | A1* | 3/2020  | Mukherjee ............... B25J 5/007 |
| 2020/0093026 | A1* | 3/2020  | Enright .................... B25J 9/026 |
| 2021/0371200 | A1* | 12/2021 | Thorhallsson ........... B25J 9/023 |
| 2023/0315346 | A1  | 10/2023 | Karr et al. |
| 2023/0320023 | A1* | 10/2023 | Huet .................... B25J 15/0286 |
|              |     |         | 414/751.1 |
| 2023/0403813 | A1* | 12/2023 | Huet ...................... B25J 11/008 |
| 2023/0413470 | A1* | 12/2023 | Huet .......................... B25J 9/04 |

OTHER PUBLICATIONS

Office Action in European Appln. No. 22204157.6, mailed on Sep. 15, 2025, 6 pages.

\* cited by examiner

700

702A      702B      702C      702D 100      704

702E      702F      702G      702H

100

702G

OBJECT HANDLING APPARATUS

CROSS-REFERENCE TO RELATED APPLICATION

This application is a continuation of U.S. application Ser. No. 17/546,397, filed on Dec. 9, 2021. The disclosure of the prior application is considered part of and are incorporated by reference in the disclosure of this application.

BACKGROUND

This specification relates to an apparatus for handling objects.

In storage facilities, such as data centers or server rooms, various pieces of electronic equipment such as hard disk drives (HDDs) or servers are often mounted in racks, sometimes referred to as rack consoles. Each rack includes means for mounting, i.e., vertically stacking, electronic components therein. Mounting means may include devices such as drawers, slots, brackets, trays, shelves, or combinations thereof.

When a certain electronic component need to be retrieved, e.g., in the case of equipment malfunction, a human technician needs to approach the rack storing the electronic component and carry out a repair action such as an electronic component replacement action at the rack location. The process of manually replacing an electronic component, that is, approaching a specific rack location within a facility, as well as removing an existing electronic component from a specific storage location inside the rack and installing a new electronic component into the specific storage location, is labor intensive and is not scalable for larger sites.

In the cases of hyperscale data centers that store of thousands or millions of electronic components, the total amount of human labor required for routine repair work can be significant. Moreover, common work schedules may further extend any unexpected downtimes that happen during off hours, e.g., until the next technician crew arrives. Further, manual repair works often require additional repair tools or equipment, such as a repair cart or lift assist system. When such necessary tools or equipment are not available, the repair work may be further delayed, even if there are currently available human technicians on site.

SUMMARY

The specification describes a robotic apparatus for handling objects. For example, the robotic apparatus can retrieve, install, or transport electronic components such as hard disk drives or other computing hardware stored in a data center in an automated manner.

In general, one innovative aspect of the subject matter described in this specification can be embodied in an apparatus comprising a main body defining a bottom surface, a back vertical surface, a first side vertical surface, and a second side vertical surface opposite to the first side vertical surface, and an open front, to define an interior space open to a front of the main body and enclosed by the bottom surface, the back vertical surface, the first side surface, and the second side surface; a drive system that propels and positions the apparatus along horizontal surface; a fan system mounted within the interior space and positioned to blow air down into the interior space; a first gripper apparatus that grips an equipment drawer of an electronics rack that is external to the apparatus and reciprocally extracts the equipment drawer from a closed position to an extracted position, and that inserts the equipment drawer from the extracted position to the closed position, wherein when the equipment drawer is in the extracted position, the equipment drawer is substantially within the interior space of the main body; and a second gripper apparatus that grips and removes a target electronic component from a target position located within the equipment drawer when the equipment drawer is in the extracted position, and that swaps the target electronic component with a replacement electronic component by inserting the replacement electronic component into the target position, wherein at least the back vertical surface of the main body includes perforations so that sufficient air flow generated by the fan system flows through the perforations to maintain cooling of electronic components in the equipment drawer when the equipment drawer is in the extracted position.

The apparatus may further comprise a height adjustable platform system mounted in the interior space, including: a first vertical support near the first side vertical surface, and a second vertical support near the second side vertical surface; a horizontal platform movably supported by the first vertical support and second vertical support; and a vertical drive system that adjusts the horizontal platform in the vertical direction on the first vertical support and second vertical support.

The height adjustable platform may substantially support the equipment drawer when the equipment drawer is in the extracted position.

The apparatus may further comprise a vision system including: a first camera mounted on the first side vertical surface of the main body and configured to capture first image data characterizing an environment in front of the first side vertical surface; a second camera mounted on the front of the main body and configured to capture second image data characterizing the electronics rack that includes the equipment drawer; and a third camera mounted on the height adjustable platform system and configured to capture third image data characterizing the equipment drawer that includes the target electronic component.

The apparatus may further comprise a control system that: generates, based on processing the first image data, drive system control signals to cause the drive system to propel and position the apparatus; generates, based on processing the second image data, first gripper apparatus control signals to cause the first gripper apparatus to (i) grip the equipment drawer of the electronics rack and reciprocally extract the equipment drawer from the closed position to the extracted position, and (ii) insert the equipment drawer from the extracted position to the closed position; and generates, based on processing the third image data, second gripper apparatus control signals to cause the second gripper apparatus to grip and remove the target electronic component from the target position located within the equipment drawer.

The control system may be further configured to receive remote control signals from a remote control system.

The apparatus may further comprise a human machine interface operatively connected to control system that displays the first, second, or third image data and receives input commands from a human operator of the apparatus.

The main body may further comprise a charging element for interfacing an external charging station to receive electrical supply.

The drive system may comprise a set of drive wheels.

The target electronic component may comprise a hard disk drive (HDD), and wherein the electronics rack may comprise a hard disk drive (HDD) storage rack.

The first side vertical surface may include a removable panel that, when removed, facilitates maintenance access from an exterior space into the height adjustable platform system that is mounted in the interior space.

The first gripper apparatus may comprise mechanisms to unlock the equipment drawer preceding to reciprocally extracting the equipment drawer from the closed position to the extracted position, and lock the equipment drawer subsequent to inserting the equipment drawer from the extracted position to the closed position.

The second gripper may comprise a gantry gripper.

Another innovative aspect of the subject matter described in this specification can be embodied in an method comprising receiving, by a control system of a robotic apparatus, instructions to perform an electronic component swap task, wherein the robotic apparatus comprises a main body that defines an interior space open to a front of the main body; generating, by the control system of the robotic apparatus, a path to approach an electronics rack that stores the target electronic component; causing, by the control system of the robotic apparatus, the robotic apparatus to move along the determined approach path toward the electronics rack; causing, by the control system of the robotic apparatus, a height adjustable platform system of the robotic apparatus to horizontally align with an equipment drawer of the electronics rack that stores the target electronic component; generating, by the control system of the robotic apparatus, first gripper apparatus control signals to cause the first gripper apparatus to grip the equipment drawer of the electronics rack and reciprocally extract the equipment drawer from a closed position to an extracted position that is substantially within the interior space of the main body; generating, by the control system of the robotic apparatus, fan system control signals to a fan system mounted within the interior space of the robotic apparatus to blow air down into the interior space; and generating, by the control system of the robotic apparatus, second gripper apparatus control signals to cause the second gripper apparatus to grip and remove the target electronic component from a target position located within the equipment drawer.

The method may further comprise generating, by the control system of the robotic apparatus, the second gripper apparatus control signals to cause the second gripper apparatus to insert a replacement electronic component into the target position from which the target electronic component has been removed; generating, by the control system of the robotic apparatus, the first gripper apparatus control signals to cause the first gripper apparatus to insert the equipment drawer from the extracted position to the closed position; and causing, by the control system of the robotic apparatus, the robotic apparatus to move along a return path to move away from the electronics rack and to a designated area.

Generating the path to approach the electronics rack may comprise: processing, by the control system of the robotic apparatus, image data generated by using a vision system of the robotic apparatus.

The target electronic component may comprise a hard disk drive (HDD), and wherein the electronics rack comprises a hard disk drive (HDD) storage rack.

The first gripper apparatus control signals may further cause the first gripper apparatus to unlock the equipment drawer preceding to reciprocally extracting the equipment drawer from the closed position to the extracted position, and lock the equipment drawer subsequent to inserting the equipment drawer from the extracted position to the closed position.

The method may further comprise: receiving, by the control system of the robotic apparatus, remote control signals from a remote control system; and generating, by the control system of the robotic apparatus, the first and second gripper apparatus control signals in accordance with the remote control signals.

The method may further comprise: receiving, by the control system of the robotic apparatus, input commands from a human operator through a human machine interface operatively connected to the control system.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages.

The techniques described in this specification allow for automated handling of electronic components and can easily integrate into existing storage facilities with any of a variety of sizes or layouts, including modern hyperscale data centers. Equipped with necessary devices or tools to relocate itself as well as to retrieve the electronic component even in the cases where it's stored within a secured, e.g., locked, rack drawer, the robotic apparatus can be used to automate the task of replacing an electronic component, i.e., removing an existing electronic component followed by inserting a new one, that is stored at an electronics rack housed within a data center. Adoption of the robotic apparatus can thus free up human resources to focus on other tasks, e.g., tasks where human intellect is imperative, as datacenter sites grow in size.

The described robotic apparatus is especially ideal for handling temperature-sensitive electronic components, such as hard disk drives. In various scenarios, for example even during repair work carried out by experienced human technicians, hard disk drives that are currently running may lose access to or otherwise be obstructed from receiving external cooling provided by the facility that houses these hard disk drives that aim at preventing critical IT equipment including these hard disk drives from overheating. When a hard disk drive overheats, its components may sustain serious damage in a matter of seconds. To address the potential overheating issues that may arise during the automated repair work, the described robotic apparatus has a body structure that is substantially perforated on at least one side so as to permit air flow therethrough, and is further equipped with a built-in fan system that can generate air flow, for example to an interior space enclosed by the body structure and thereby provide additional cooling to any object therein. The use cases in which the described robotic apparatus may be applicable therefore further extend into temperature-sensitive ones.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
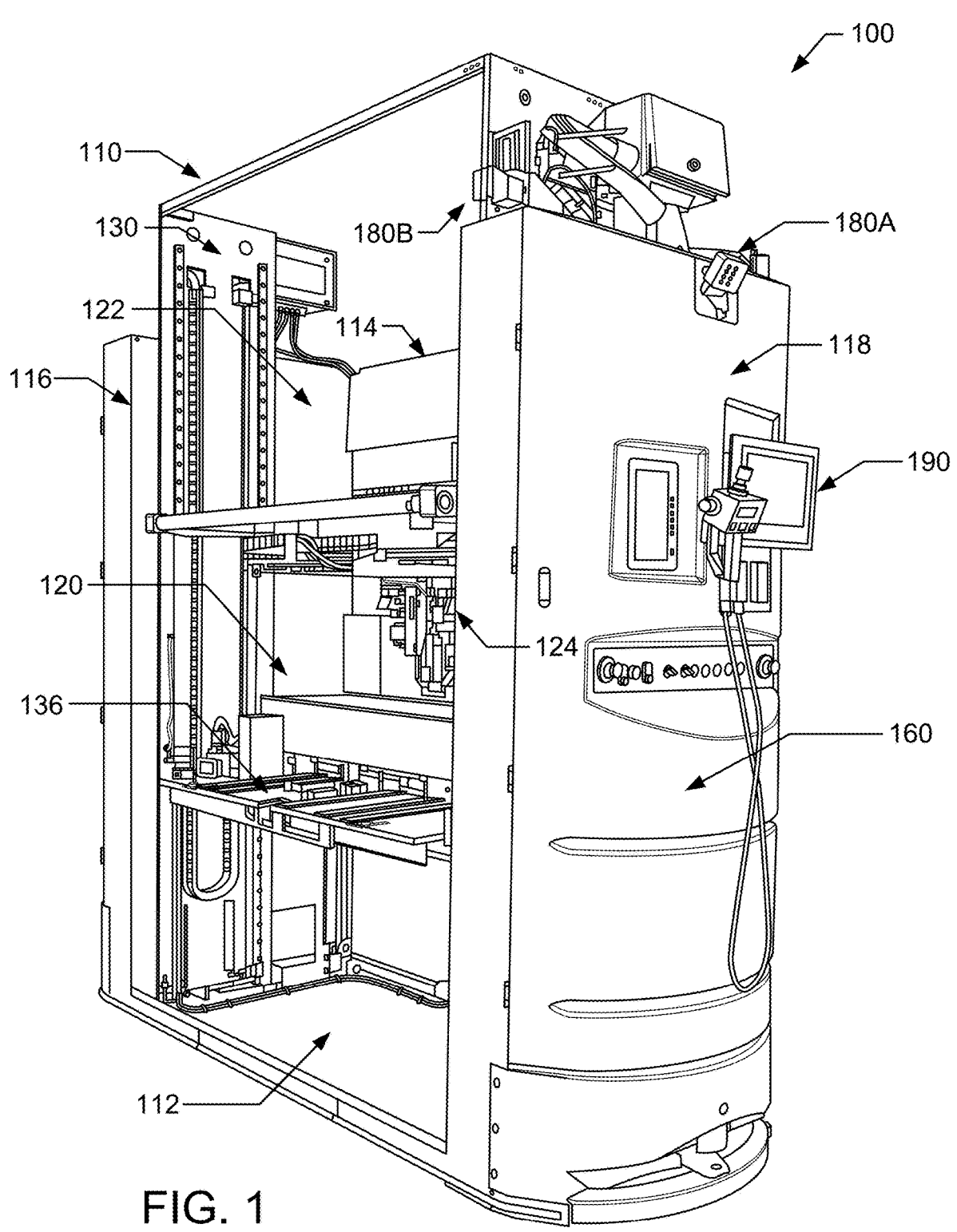
FIG. 1 is a perspective view of an example implementation of a robotic apparatus for handling electronic components.

The specification describes a robotic apparatus for handling objects. For example, the robotic apparatus can retrieve, install, or transport electronic components such as hard disk drives or other computing hardware stored in a data center in an automated manner. In some of these examples, the robotic apparatus may be fully automated and operated by a control system located on the robotic apparatus. In others of these examples, different levels of assistance (e.g., from a human operator or a remote control system) may be used to control or assist operation of the robotic apparatus, ranging from direct remote control (referred to as "teleoperation") to select supervision of certain tasks or functions.

The robotic apparatus includes a main body that defines a bottom surface, a back vertical surface that is substantially perforated, a first side vertical surface, and a second side vertical surface opposite to the first side vertical surface, and an open front. Collectively, the bottom surface, the back vertical surface, the first side surface, and the second side surface define an interior space open to a front of the main body. The robotic apparatus is made mobile by coupling the main body to a drive system including a wheeled base, e.g., a holonomic base (i.e., a base that can move in any direction), that propels and positions the apparatus along the ground surface.

To permit flexibility in accessing electronic components that may be stored at any location, e.g., at any height, of an electronics rack, a height adjustable platform system is installed in the interior space of the robotic apparatus. In some implementations, the height adjustable platform system is mounted therein in the form similar to a gantry, i.e., with a first vertical support near the first side vertical surface, a second vertical support near the second side vertical surface, and a horizontal platform that is movably supported by the first vertical support and second vertical support and that may be driven by a vertical drive system. In some implementations, the height adjustable platform system can include a first gripper apparatus that grips an equipment drawer of an electronics rack and reciprocally extracts the equipment drawer from a closed position to an extracted position, and that inserts the equipment drawer from the extracted position to the closed position. In some of these implementations, the equipment drawer, when in the extracted position, may rest substantially on the height adjustable platform. In some implementations, the height adjustable platform system can further include a second gripper apparatus that grips and removes a target electronic component from a target position located within the equipment drawer when the equipment drawer is in the extracted position, and that swaps the target electronic component with a replacement electronic component by inserting the replacement electronic component into the target position.

These features and additional features will be described in more detail below. It is worthwhile noting that although the robotic apparatus described in this document is largely described in the context of handling electronic components such as hard disk drives or other computing hardware stored on electronics racks within a data center, the robotic apparatus as well as associated techniques can be similarly applied to any of a variety of other use cases. For example, the robotic apparatus can be used to handle other communications and information technology equipment components, such as servers, CPUs, internetworking equipment and storage devices, that are commonly designed for mounting to racks and for housing within rack enclosures, for example in small wiring closets as well as equipment rooms and large server rooms. As yet another example, the robotic apparatus can be used to facilitate automated object or material handling in logistic facilities such as warehouses, superstores, and other manufacturing facilities.

FIG. 1 is a perspective view of an example implementation of a robotic apparatus 100 for handling electronic components. As shown in FIG. 1, in some implementations, the robotic apparatus 100 can have a main body 110 that defines a bottom surface 112, a back surface 114, a first side surface 116, and a second side surface 118 opposite to the first side surface 116, and an open front 120. In some such implementations, the back surface 114, the first side surface 116, and the second side surface 118 can be substantially vertical with respect to the bottom surface 112. Collectively, the bottom surface 112, the back vertical surface 114, the first side surface 116, and the second side surface 118 define an interior space 122 open to a front 120 of the main body 110.

Figure 2A:
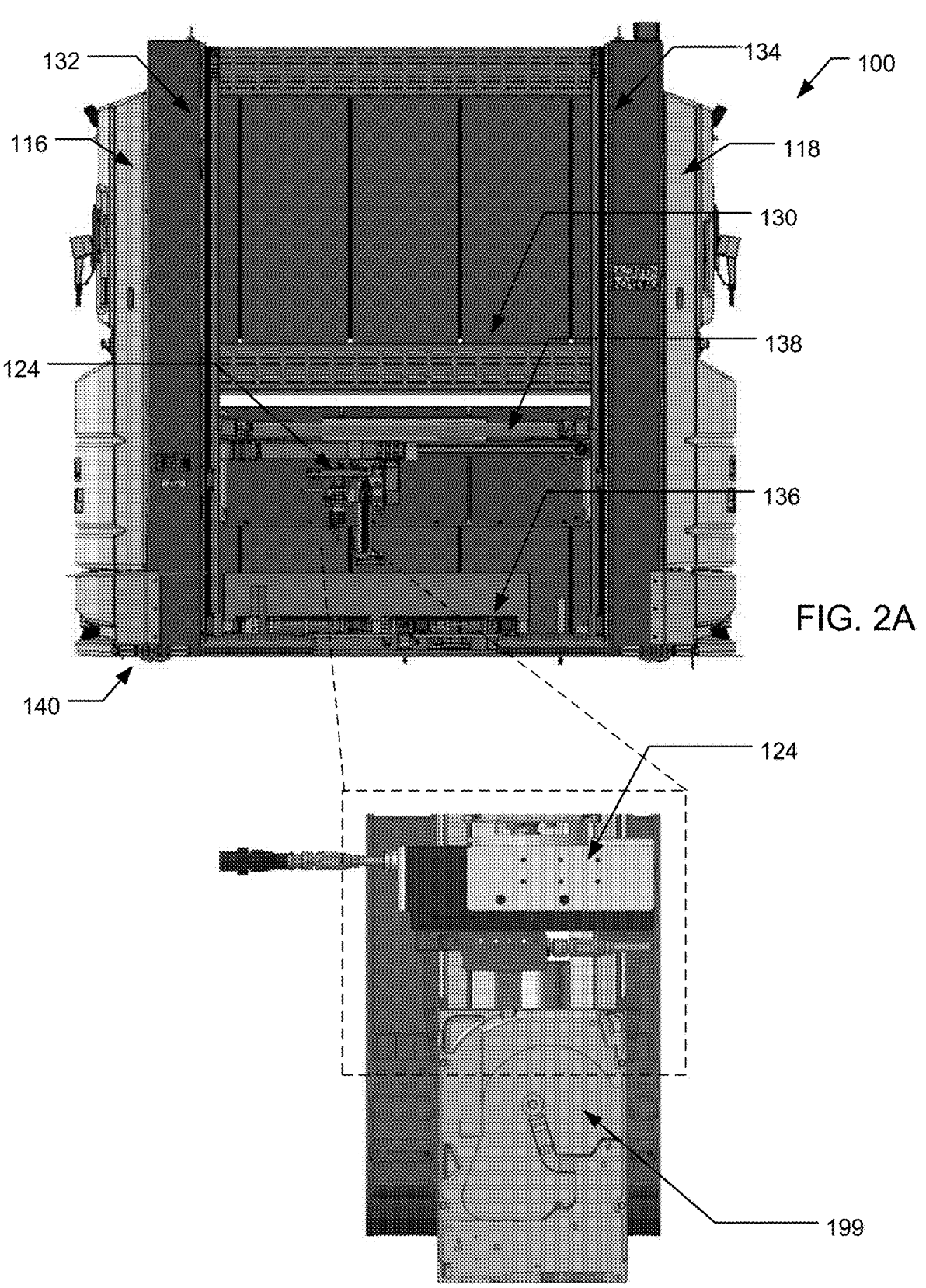
FIGS. 2A and 2B are side views of another example implementation of a robotic apparatus, respectively.
Figure 2B:
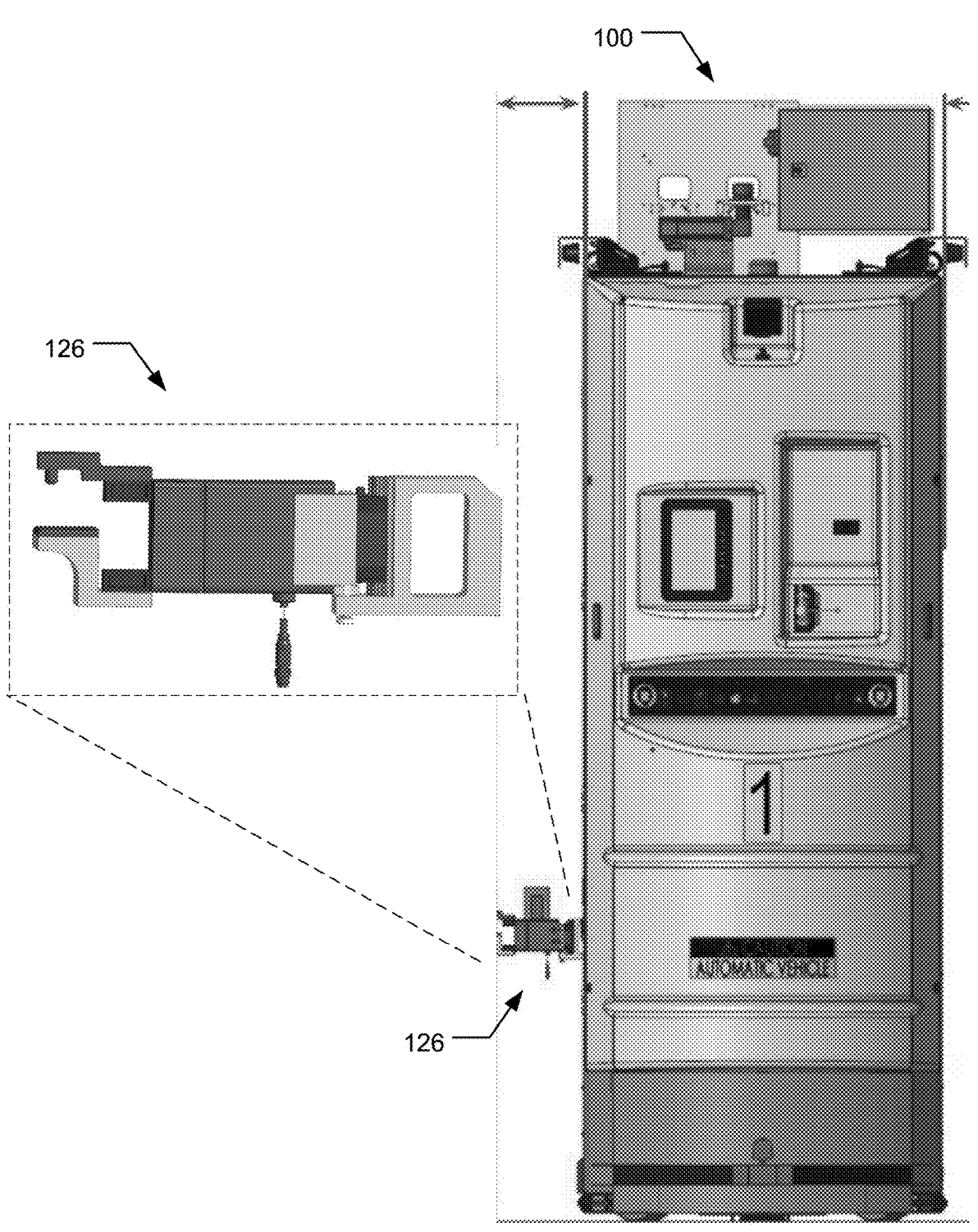

FIGS. 2A and 2B are side views of another example implementation of a robotic apparatus, e.g., the robotic apparatus 100 of FIG. 1, respectively. As shown in FIG. 2A, the robotic apparatus 100 is made mobile by coupling the main body 110 to a drive system including a wheeled base 140. The wheeled base 140 has a set of multiple drive wheels, each of which may be driven by a servo motor to propel and position the apparatus along a ground surface.

The robotic apparatus 100 can use a grasping end effector 124 to pick electronic components from their stored location (e.g., from an equipment drawer of an electronics rack) and transfer them to a temporary location, or vice-versa. In the example of FIG. 2A, the robotic apparatus 100 uses the grasping end effector 124 to pick a hard drive disk 199. In some implementations, the end effector 124 may be a mechanically actuated gripper apparatus. In other implementations, the end effector 124 may be a simple gripper, a suction cup, an electroadhesion end effector, a magnetic end effector, or a combination thereof, and the robotic apparatus 100 may include an end effector swap mechanism configured to permit a change of the end effector.

In some implementations, as shown in FIG. 2B, the robotic apparatus 100 can use another end effector 126 to reciprocally engage, i.e., extract or insert, individual mounting means of a rack such as drawers, slots, brackets, trays, or shelves that are each capable of storing a number of the electronic components therein. For example, the other end effector 126 may be a gripper apparatus, and the robotic apparatus 100 can use the gripper apparatus to pull an equipment drawer provided in an electronics rack, e.g., by grasping a drawer handle, outward of the electronics rack and toward the interior space 122 of the robotic apparatus 100 by a predetermined length. When the equipment drawer is in the extracted position, the equipment drawer may be substantially within the interior space 122 of the main body 110. In some such implementations, the other end effector 126 can additionally include tools or mechanisms to unlock and lock these mounting means, e.g., to release the drawer handle from a locked (or secured) position.

To permit flexibility in accessing electronic components that may be stored at any location, e.g., at any height, of an electronics rack, a height adjustable platform system 130 is installed in the interior space 122 of the robotic apparatus 100.

Figures 3A, 3B:
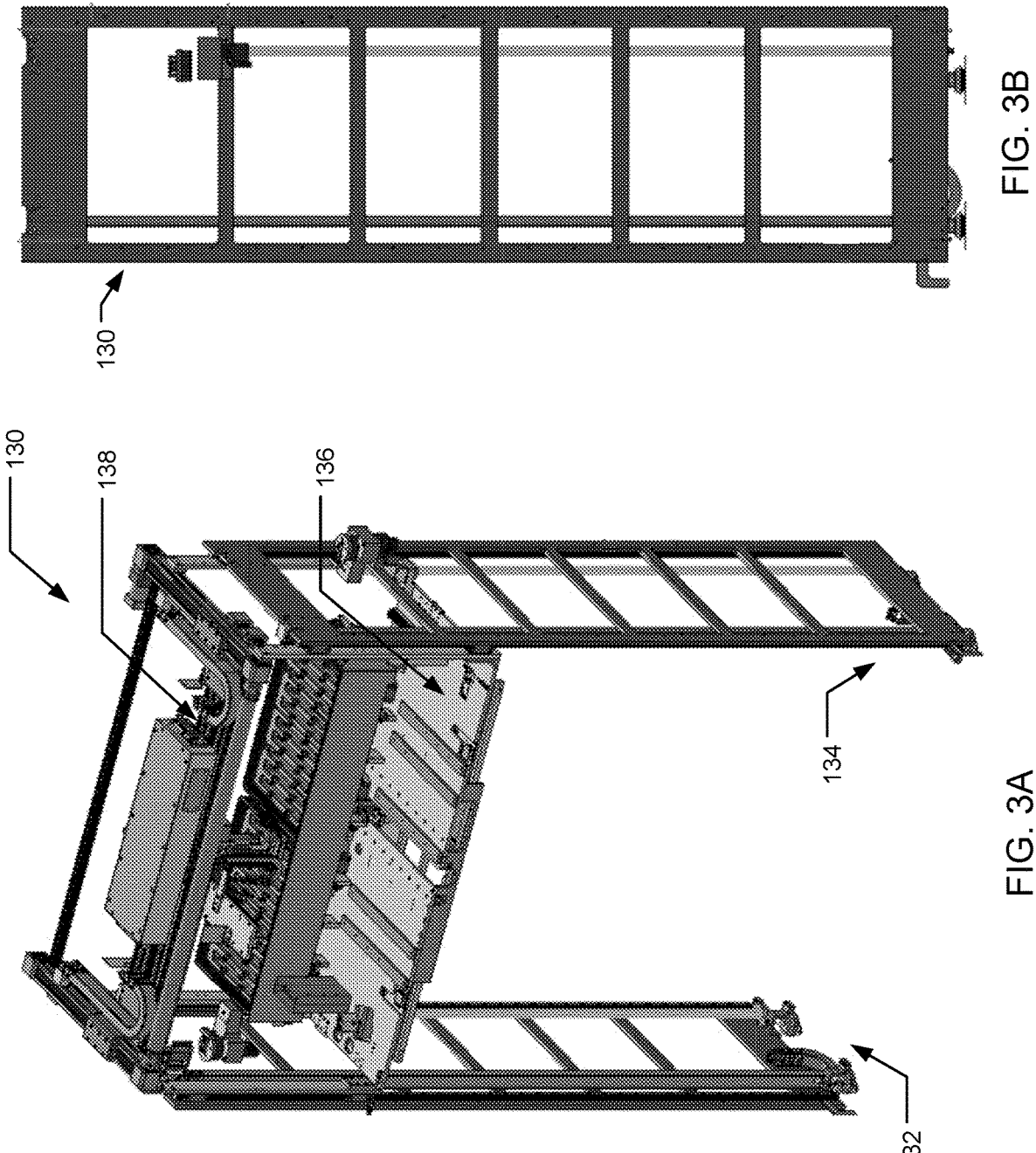
FIGS. 3A and 3B are perspective and side views of an example height adjustable platform system mounted in an interior space of a robotic apparatus, respectively.

FIGS. 3A and 3B are perspective and side views of an example height adjustable platform system 130 mounted in an interior space 122 of a robotic apparatus, e.g., the robotic apparatus 100 of FIG. 1, respectively. The height adjustable platform system 130 has a first vertical support 132 near the first side surface 116, and a second vertical support 134 near the second side surface 118 of the robotic apparatus 100. The height adjustable platform system 130 also has a horizontal platform 136 that is movably supported by the first vertical support 132 and second vertical support 134. The robotic apparatus 100 can use the horizontal platform 136 to support the electronic component handing operations. For example, the horizontal platform 136 may function as a temporary storage bed for picked electronic components and replacement electronic components to be installed into an electronics rack. As another example, the horizontal platform 136 may additionally function as a temporary support for an equipment drawer when in the extracted position, i.e., when the drawer is substantially within the interior space 122 of the main body 110.

As shown in FIGS. 3A-B, in some implementations, the first vertical support 132 and the second vertical support 134 can each include a respective vertical rail, and the horizontal platform 136 can engage the vertical rails and, when driven by a vertical drive system, e.g., a drive system that includes one or more servo motors, to move up or down and along the vertical rails. In some of these implementations, in addition moving in a vertical direction, the horizontal platform 136 can also move in a horizontal direction, e.g., to extend out of or extract into the interior space 122 of the main body 110. This configuration provides the horizontal platform 136 with additional capability in supporting the electronics component handling operations, e.g., the capability to better engage with the rack enclosures within which the electronics components are stored.

In some implementations, the height adjustable platform system 130 also includes a horizontal rail 138 that is above the horizontal platform 136 and that is similarly movably supported by the first vertical support 132 and second vertical support 134. In these implementations, the grasping end effector 124 can be mounted on the horizontal rail 138 and, when driven by a horizontal drive system, to move left or right and along the horizontal rail. That is, the grasping end effector 124 can be a gantry gripper, with a first end portion pivotally and movably carried by the horizontal rail 138 and a second end portion that includes the grasping mechanism. This configuration permits at least a two degrees-of-freedom (DoF) motion of the grasping end effector 124—with a first DoF provided by the vertical supports and a second DoF provided by the horizontal rail.

In some of these implementations, the other end effector 126 that is configured to reciprocally engage the individual mounting means of the rack, when included, can also be carried by the height adjustable platform system 130. For example, the other end effector can be attached to the horizontal platform 136. As another example, the other end effector can be mounted on the horizontal rail 138.

Most electronic components, including hard disk drives and other communications and information technology equipment components, consume electrical power and generate heat. Heat produced by the electronic components can have adverse effects on the performance, reliability and useful life of the electronic components. Data centers are thus typically equipped with an external air conditioning or cooling system that supplies and circulates cool air to rack-mounted electronic components and enclosures. In various scenarios, for example due to the close proximity to the electronics rack of the robotic apparatus 100 during its operation or due to the equipment drawer being in an extracted position that is outside of the electronics rack that provides cooling therein, however, some electronic components may lose access to or otherwise be obstructed from receiving the external cooling. In particular, certain electronics components such as hard disk drives housed within an enclosure are particularly vulnerable to heat during operation.

As such, the robotic apparatus 100 makes use of various thermal management techniques and/or heat dissipation techniques so that any heat build-up or hot spots generated as a result of the operation of the robotic apparatus 100 within the data center may be limited or reduced.

Figure 4:
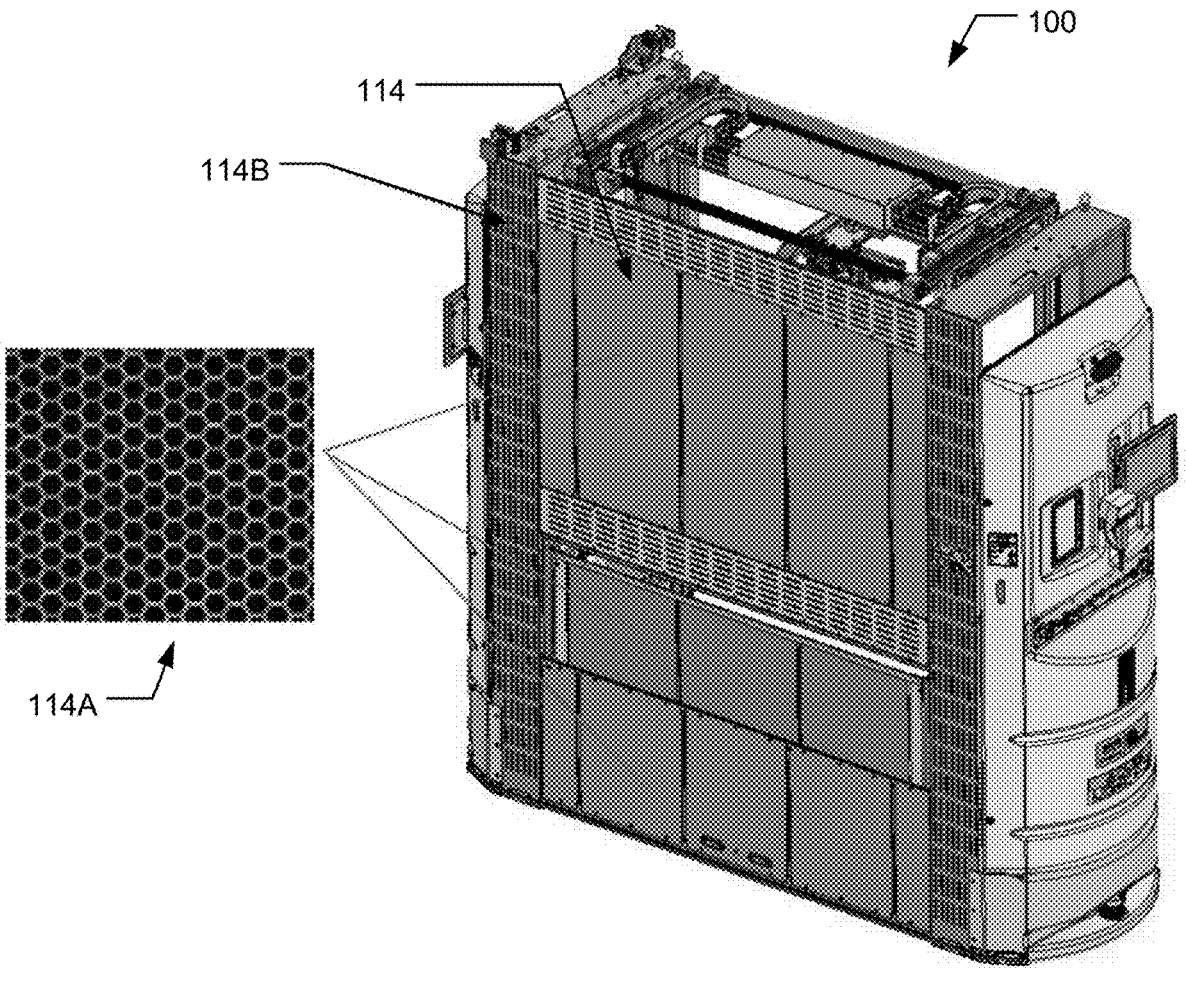
FIG. 4 shows an example back vertical surface of a robotic apparatus.

FIG. 4 shows an example back vertical surface of a robotic apparatus, e.g., the robotic apparatus 100 of FIG. 1. As shown in FIG. 4, in some implementations, the back surface 114 of the robotic apparatus 100 includes one or more substantially perforated, e.g., slotted hole perforated, vertical panels 114A-B. For example, these vertical panels can be 60%, 80%, or more open perforation panels, and the back surface 114 can have different vertical panels with different perforations. The perforated openings in the back surface 114 permit air flow therethrough.

Figure 5A:
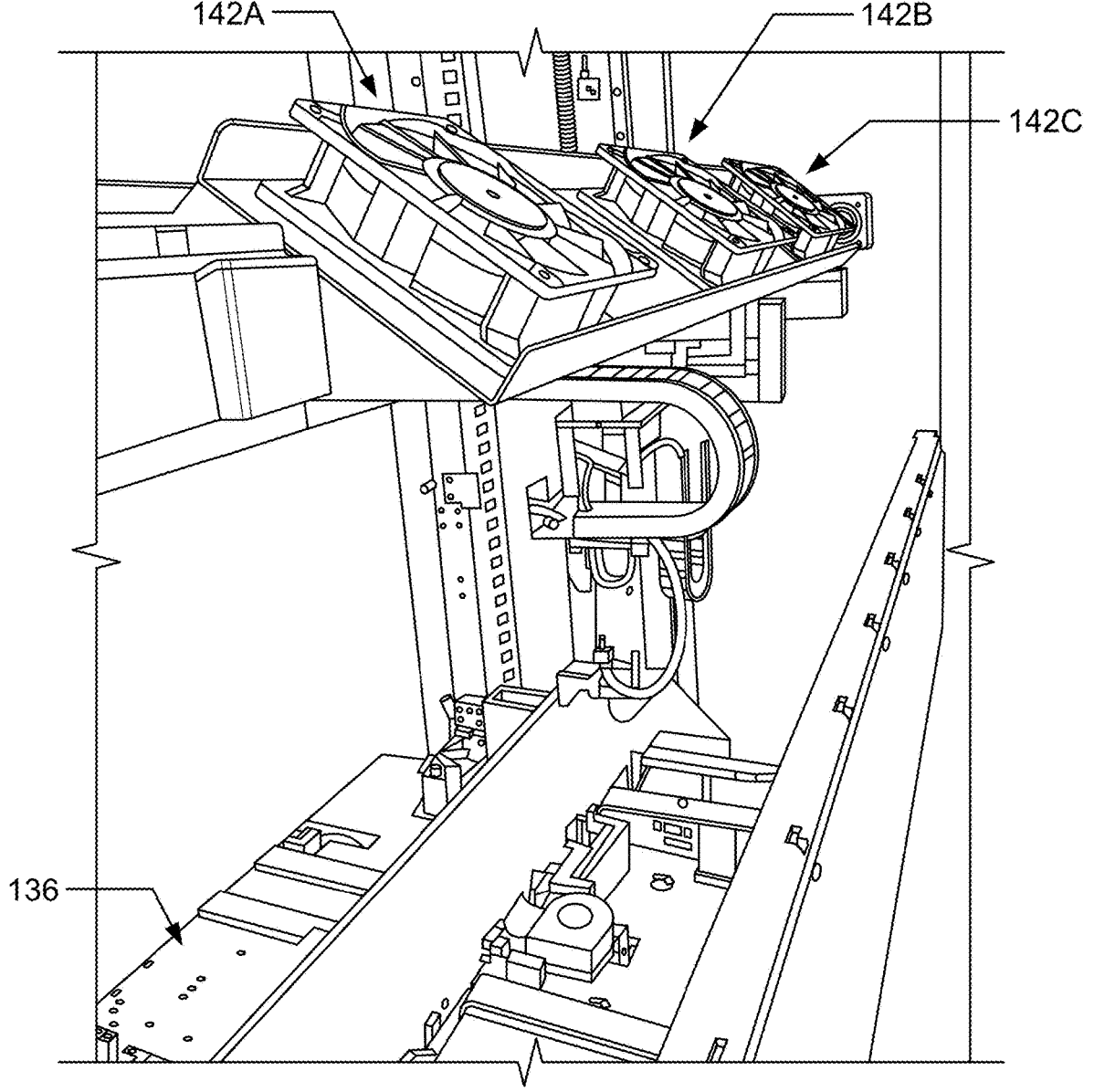
FIGS. 5A and 5B show example fan systems installed in an interior space of a robotic apparatus.
Figure 5B:
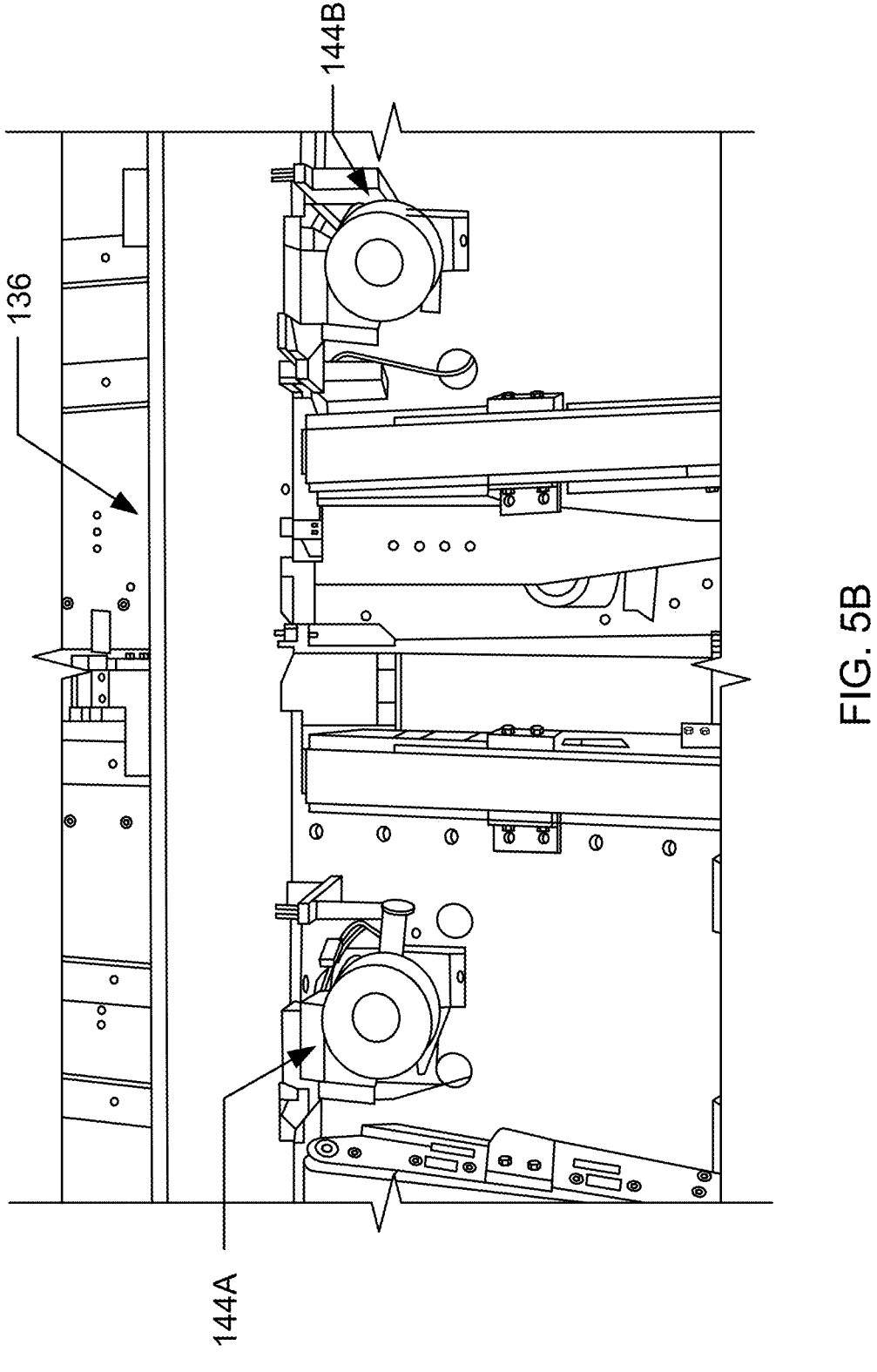

FIGS. 5A and 5B show example fan systems installed in an interior space of a robotic apparatus, e.g., the robotic apparatus 100 of FIG. 1. The robotic apparatus 100 uses the fan system to dissipate heat by creating a flow of air. In particular, the fan system can include one or more axial fans, one or more blowers, one or more cross-flow fans, or one or more slim blowers. As shown in FIG. 5A, in some implementations, the fan system, which in turn includes a total of three axial fans 142A-C, can be mounted above and directed downward to the horizontal platform 136. As shown in FIG. 5B, in some other implementations, the fan system, which in turn includes a total of two axial fans 144A-B, can be mounted below the horizontal platform 136. In addition, in some implementations, other cooling elements designed to perform heat dissipation, such as heat pipes, heat links, heat transfers, heat spreaders, or vents, can be used to add additional cooling capabilities to the robotic apparatus 100.

In conjunction with the substantially perforated back surface, the fan system can cool the interior space 122 of the robotic apparatus 100 by creating a flow of air that blows through the interior space 122 within which the horizontal platform 136 is positioned, and subsequently exhausting air from a rear side of the robotic apparatus 100, i.e., through the perforated openings in the back surface 114. As described above, the horizontal platform 136 may function as a temporary storage bed for picked electronic components, or as a temporary support for an equipment drawer when in the extracted position, and the robotic apparatus 100 can use the fan system to provide additional cooling to the picked electronic component or to the equipment drawer (which may contain a number of other electronic components) that rests on the horizontal platform 136.

Referring back to FIG. 1, the robotic apparatus 100 has multiple sensors. In particular, in some implementations, the robotic apparatus 100 can have a set of sensors that enable autonomous navigation within a data center and that allow it to identify and localize individual electronics racks from which an electronic component needs to be retrieved. The set of sensors can be any 3D sensing devices capable of sensing the local environment that include, for example, 3D depth cameras, color cameras, laser ranging devices, radar devices, or a combination thereof.

In some of these implementations, the robotic apparatus 100 can have a first camera 180A mounted on the first side surface 116 of the main body 110 and configured to capture first image data characterizing an environment in front of the first side surface 116 (e.g., including any obstacle that may be present in the path of the robotic apparatus); a second camera 180B mounted on the front 120 of the main body 110 and configured to capture second image data characterizing the electronics rack that includes the equipment drawer; and a third camera mounted on the height adjustable platform system 130 and configured to capture third image data characterizing, e.g., from a top view perspective, the equipment drawer that includes the electronic component to be picked.

In some implementations, the robotic apparatus 100 can have another set of sensors that enable the robotic apparatus 100 to more rapidly locate and identify an electronic component from an electronics rack. The other set of sensors can include one or more barcode or radio frequency identification (RFID) scanners that provide signals related to detection, identification, and location of the electronic component to be picked.

In some of these implementations, the robotic apparatus 100 can have a barcode scanner mounted on the grasping end effector 124 that provides signals related to a unique identification for the electronic component to be picked.

The robotic apparatus 100 has an onboard control system 160 which is configured to run a set of programs with algorithms capable of performing navigation and electronic component handling operations. In particular, the onboard control system 160 can include one or more computer processors and one or more memory storage devices storing computer program instructions executable by the one or more computer processors to process data received from each of the onboard sensors and output control signals to the components onboard the robotic apparatus 100, i.e., to the wheeled base 140, the height adjustable platform system 130, the grasping end effector 124, and, when included, the other end effector 126, for apparatus navigation, electronic component picking or placing, and equipment drawer engagement, respectively. The onboard control system 160 may also communicate with a remote control system (e.g., a remote automated system or a remote human-operated system) to receive electronic component swap information and respond back with confirmation data to inform the remote control system of successful electronic component swaps or any errors that might occur. Additionally or alternatively, the onboard control system 160 may receive remote control signals from the remote control system and directly control the components onboard the robotic apparatus 100 in accordance with the remote control signals.

Figure 6:
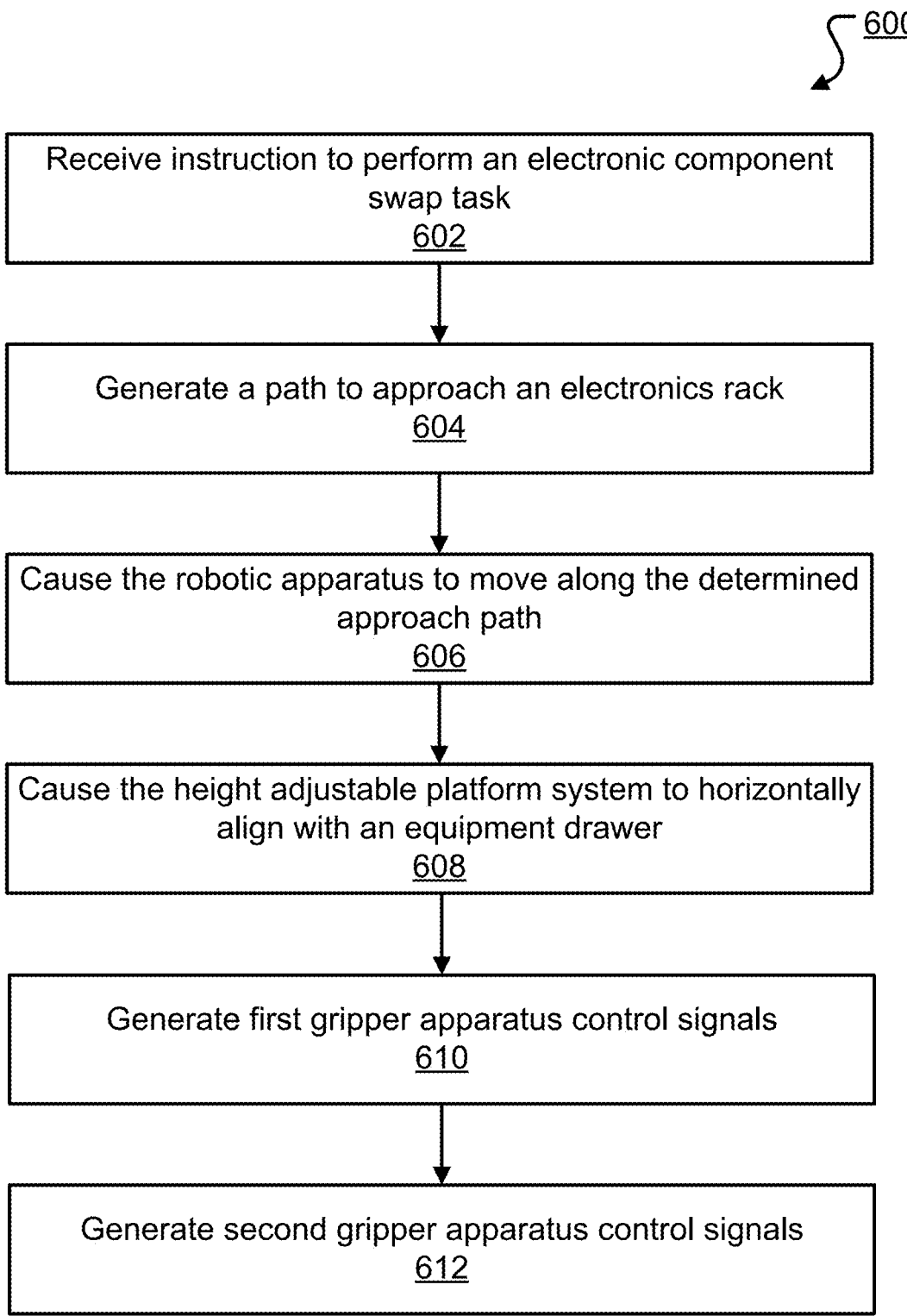
FIG. 6 shows a flow diagram of an example process for operating a robotic apparatus.

FIG. 6 shows a flow diagram of an example process 600 for operating a robotic apparatus, e.g., the robotic apparatus 100 of FIG. 1. For convenience, the process 600 will be described as being performed by a system of one or more computers located in one or more locations. For example, a control system, e.g., the control system 160 of the robotic apparatus 100 of FIG. 1, appropriately programmed in accordance with this specification, can perform the process 600.

The system receives instructions to perform an electronic component swap task (step 602). The instructions to perform the electronic component swap task may include any type of digital signal or information that is receivable by the system. In some examples, the instructions may include a signal to pick up a target electronic component associated with additional information identifying the target electronic component, e.g., target position information about which electronics rack (as well as which equipment drawer of the electronics rack) the target electronic component is stored at. In some of these examples, the system may receive the instructions as input by a human operator that are entered through an input device of the robotic apparatus. In others of these examples, the instructions may instead be sent by the remote control system over a data communication network to the onboard system.

The system generates a path to approach an electronics rack that stores the target electronic component (step 604). In particular, the system can determine an approach path for the robotic apparatus to move along in order to position itself with the open front directly facing the electronics rack. The approach path may start at a current positioning of the robotic apparatus. In some examples, the approach path may be determined over time as robotic apparatus moves along the path and as new sensor data becomes available.

In some examples, the approach path may be determined by the system by using an onboard navigation software module which runs a set of route planning algorithms and by using a pre-stored map of the data center. In other examples, the approach path may instead be determined by the remote control system and then sent to the onboard system of the robotic apparatus for execution.

The system causes the robotic apparatus to move along the determined approach path toward the electronics rack (step 606). In particular, the system can output drive system control signals to servo motors which in turn drive the wheeled base to cause the robotic apparatus to navigate along the path toward the electronics rack. In some examples, to generate the drive system control signals, the system processes, e.g., extracts information for navigation from, the first image data captured by the first camera mounted on the first side surface of the main body of the robotic apparatus.

The system causes the height adjustable platform system to horizontally align with an equipment drawer of the electronics rack (step 608). More specifically, the system can output vertical drive system control signals to the servo motors of the vertical drive system to adjust the horizontal platform in the vertical direction, i.e., to raise or lower the horizontal platform, to a height such that it can support the equipment drawer once the drawer is in an extracted position. In some examples, to generate the vertical drive system control signals, the system processes second image data captured by the second camera mounted on the front of the main body and configured to capture second image data characterizing the electronics rack that includes the equipment drawer.

The system generates first gripper apparatus control signals to cause the first gripper apparatus to grip the equipment drawer of the electronics rack and reciprocally extract the equipment drawer from a closed position to an extracted position (step 610). In the cases where the equipment drawer is locked, the system can additionally generate control signals to cause the first gripper apparatus to unlock the equipment drawer, e.g., by using appropriate tools or mechanisms.

As described above, when the equipment drawer is in the extracted position, the equipment drawer may be substantially within the interior space of the main body and may rest on the horizontal platform that is movably supported by the height adjustable platform system. In some implementations, the system can output control signal to the fan system to cause it to begin blowing air down into the interior space, e.g., toward the extracted equipment drawer.

The system generates second gripper apparatus control signals to cause the second gripper apparatus to grip and remove the target electronic component from a target position located within the equipment drawer (step 612). In some implementations, the gripper apparatus control signals can additionally cause the second gripper apparatus to place the picked target electronic component on the horizontal platform of the robotic apparatus. In some examples, to generate the second gripper apparatus control signals, the system processes third image data captured by the third camera mounted on the height adjustable platform system and configured to capture third image data characterizing the equipment drawer that includes the target electronic component.

In some implementations, when performing steps 608-612, the system additionally consumes data captured by one or more barcode or radio frequency identification (RFID) scanners that provide signals related to unique identification of the target electronic component to be removed.

Next, to complete the electronic component swap task, the system can generally perform steps 604-612 again but in a reverse order. That is, the system generates second gripper apparatus control signals to cause the second gripper apparatus to insert a replacement electronic component, which may be carried by the robotic apparatus, into the target position from which the target electronic component has been removed; generates first gripper apparatus control signals to cause the first gripper apparatus to insert the equipment drawer from the extracted position to the closed position and, optionally, to lock the equipment drawer; and generates drive system control signals to cause the drive system to propel and position the robotic apparatus, which now instead carries the removed electronic component, to move to a designated area of the data server, e.g., to a maintenance station.

In some implementations, the robotic apparatus 100 has a human machine interface 190 operatively connected to the onboard control system 160. The human machine interface 190 can include a graphical display monitor and an input device, where the input device can for example be a touch screen (which may be included as part of the graphical display monitor), a control stick, a track ball, voice command, a keyboard, input buttons (including an emergency stop button), or any combination thereof. The human machine interface 190 allows a human operator to better command and control the robotic apparatus 100 to perform the electronic component swap tasks. For example, the human machine interface 190 may display in real-time on the graphical display monitor the first, second, or third image data captured by the onboard camera sensors. As another example, the human machine interface 190 may display information about any fault or error that has occurred during operation on the graphical display monitor. As yet another example, the human machine interface 190 may allow the human operator to manually enter electronic component swap information or other input commands through the input device, thus sending the robotic apparatus on its mission.

The robotic apparatus 100 can also be equipped with repair accessibility features that ensure easy and safe human access into the interior space 122 of the robotic apparatus 100 during operation, e.g., in the cases where the robotic apparatus 100 is down. In particular, the onboard cables and wires can be routed through the top support or the bottom surface of the robotic apparatus 100, and the back surface 114, the first side surface 116, and the second side surface 118 can each include one or more removable panels that, once removed, create large openings that facilitate maintenance access from an exterior space into the interior space 122, including to the height adjustable platform system 130 that is mounted therein.

The components onboard the robotic apparatus 100 may be powered from one or more onboard batteries, which can be housed within the main body 110, e.g., at the back surface 114, or within the wheeled base 140. The batteries may supply power to the robotic apparatus 100 during navigation and picking for a limited time, and may be rechargeable to maintain operation. Battery charging may occur separately from the robotic apparatus 100, or charging may occur opportunistically during times at which no electronic components swap is needed. In the former case, the batteries may be swapped with separately charged batteries for continued operation of the robotic apparatus 100. In the latter case, for opportunistic charging, the robotic apparatus 100 can have a charging element for interfacing an external charging station (e.g., a charging station that is located in a designated area of the data center) to receive electrical supply, i.e., to make temporary electrical contacts with the charging station which feed power into the onboard batteries.

Figure 7A:
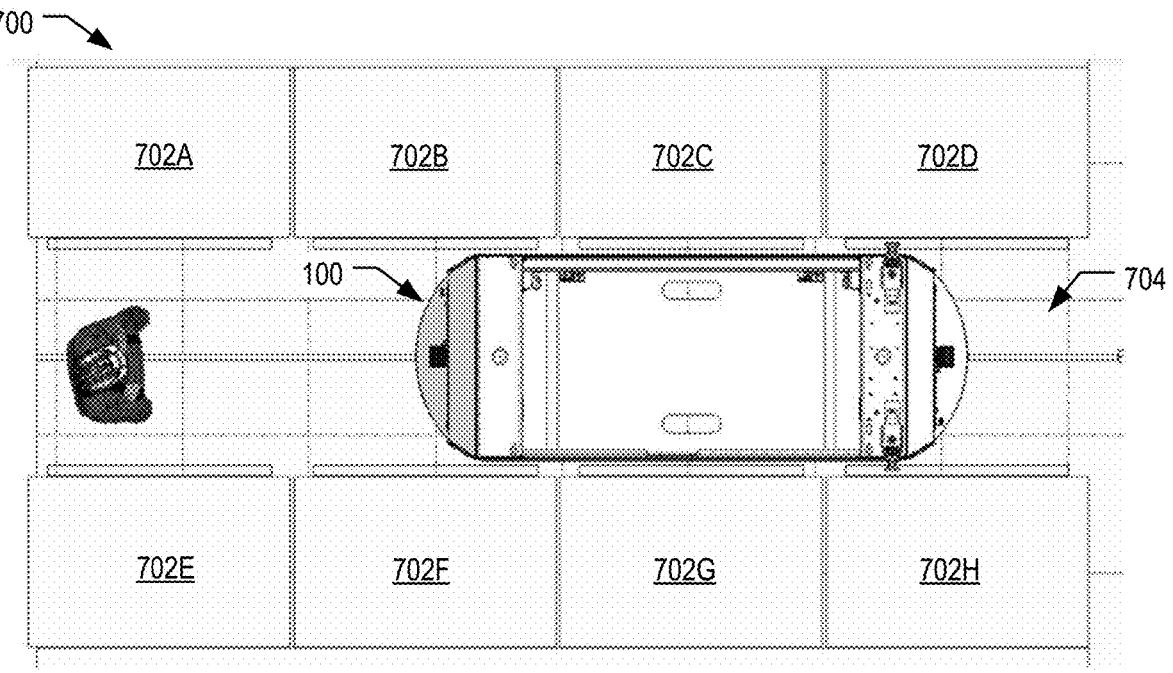
FIGS. 7A and 7B show an example environment in which a robotic apparatus of operates from a top and side view, respectively.
Figure 7B:
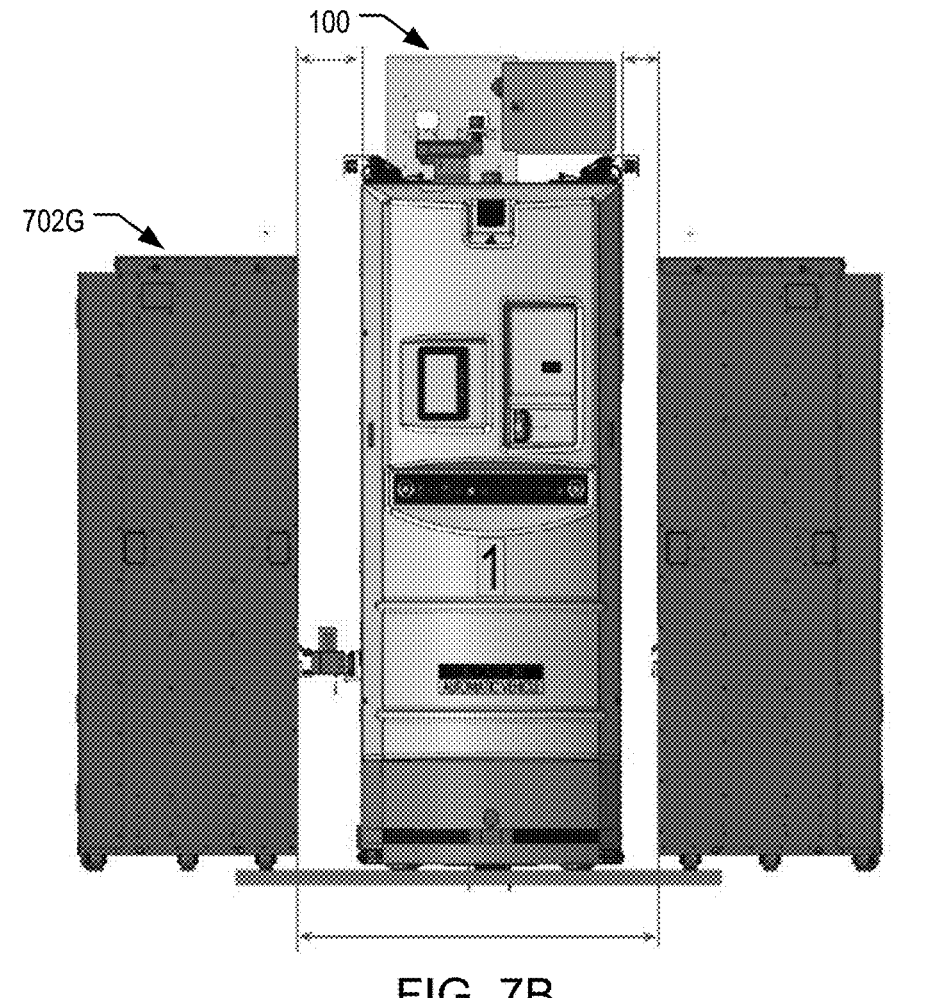

FIGS. 7A and 7B show an example environment 700 in which a robotic apparatus, e.g., the robotic apparatus 100 of FIG. 1, operates from a top and side view, respectively.

FIG. 7A shows an exemplary top view floor plan of a section of a data center 700 which includes two rows of electronics racks 702A-702D and 702E-702H and an aisle 704 separated by the two row of the electronics racks along which the robotic apparatus 100 can travel. Each rack includes means for mounting, i.e., vertically stacking, electronic components such as hard drive disks therein. The presently disclosed robotic apparatus 100 enables electronic components stored within an electronics rack, e.g., electronics rack 702G, to be replaced in an automated manner. That is, the presently disclosed robotic apparatus 100 can automatically transport a new electronic component to an electronics rack, remove an existing electronic component from the electronics rack, install the replacement electronic component into the position from which the existing electronic component is just removed, and then transport the removed electronic component to a designated area within the data center, e.g., to a maintenance station.

As shown in FIG. 7B, at the electronics rack 702G, the robotic apparatus 100 can perform an electronic component swap task by positioning it's open front 120 toward the electronics rack and with the use of the end effectors 124 and 126, both of which can be mounted on the height adjustable platform system 130.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
receiving, by a control system of a robotic apparatus, instructions to perform an electronic component swap task, wherein the robotic apparatus comprises a main body that defines an interior space open to a front of the main body;

generating, by the control system of the robotic apparatus, a path to approach an electronics rack that stores a target electronic component;

causing, by the control system of the robotic apparatus, the robotic apparatus to move along the determined approach path toward the electronics rack;

causing, by the control system of the robotic apparatus, a height adjustable platform system of the robotic apparatus to horizontally align with an equipment drawer of the electronics rack that stores the target electronic component, comprising adjusting a horizontal platform that is mounted in an interior space of a main body of the robotic apparatus to a height of the equipment drawer of the electronics rack that is external to the apparatus such that the horizontal platform will support the equipment drawer when the equipment drawer is in an extracted position from the electronics rack and is received within the interior space.

2. The method of claim 1, further comprising:

generating, by the control system of the robotic apparatus, first gripper apparatus control signals to cause a first gripper apparatus to grip the equipment drawer of the electronics rack and reciprocally extract the equipment drawer from a closed position to the extracted position; and generating, by the control system of the robotic apparatus, second gripper apparatus control signals to cause a second gripper apparatus to grip and remove the target electronic component from a target position located within the equipment drawer.

3. The method of claim 2, further comprising:

generating, by the control system of the robotic apparatus, the second gripper apparatus control signals to cause the second gripper apparatus to insert a replacement electronic component into the target position from which the target electronic component has been removed;

generating, by the control system of the robotic apparatus, the first gripper apparatus control signals to cause the first gripper apparatus to insert the equipment drawer from the extracted position to the closed position; and causing, by the control system of the robotic apparatus, the robotic apparatus to move along a return path to move away from the electronics rack and to a designated area.

4. The method of claim 3, wherein generating the path to approach the electronics rack comprises:

processing, by the control system of the robotic apparatus, image data generated by using a vision system of the robotic apparatus.

5. The method of claim 1, wherein the target electronic component comprises a hard disk drive (HDD), and wherein the electronics rack comprises a hard disk drive (HDD) storage rack.

6. The method of claim 3, wherein the first gripper apparatus control signals further causes the first gripper apparatus to unlock the equipment drawer preceding to reciprocally extracting the equipment drawer from the closed position to the extracted position, and lock the equipment drawer subsequent to inserting the equipment drawer from the extracted position to the closed position.

7. The method of claim 3, further comprising:

receiving, by the control system of the robotic apparatus, remote control signals from a remote control system; and generating, by the control system of the robotic apparatus, the first and second gripper apparatus control signals in accordance with the remote control signals.

8. The method of claim 1, further comprising:

receiving, by the control system of the robotic apparatus, input commands from a human operator through a human machine interface operatively connected to the control system.

9. An apparatus, comprising:

a main body defining a bottom surface, a back vertical surface, a first side vertical surface, and a second side vertical surface opposite to the first side vertical surface, and an open front, to define an interior space open to a front of the main body and enclosed by the bottom surface, the back vertical surface, the first side vertical surface, and the second side vertical surface;

a drive system that propels and positions the apparatus along a horizontal surface;

a height adjustable platform system mounted in the interior space, including:

a first vertical support near the first side vertical surface, and a second vertical support near the second side vertical surface;

a horizontal platform movably supported by the first vertical support and second vertical support; and a vertical drive system that adjusts the horizontal platform in the-a vertical direction on the first vertical support and second vertical support;

wherein the horizontal platform is adjusted to a height of an equipment drawer of an electronics rack that is external to the apparatus such that the horizontal platform supports the equipment drawer when the equipment drawer is in an extracted position from the electronics rack and is received within the interior space.

10. The apparatus of claim 9, wherein the apparatus further comprises a vision system including:

a first camera mounted on the first side vertical surface of the main body and configured to capture first image data characterizing an environment in front of the first side vertical surface;

a second camera mounted on the front of the main body and configured to capture second image data characterizing the electronics rack that includes the equipment drawer; and a third camera mounted on the height adjustable platform system and configured to capture third image data characterizing the equipment drawer that includes a target electronic component.

11. The apparatus of claim 10, further comprising:

a first gripper apparatus that grips the equipment drawer of the electronics rack that is external to the apparatus and reciprocally extracts the equipment drawer from a closed position to the extracted position, and that inserts the equipment drawer from the extracted position to the closed position; and a second gripper apparatus that grips and removes the target electronic component from a target position located within the equipment drawer when the equipment drawer is in the extracted position, and that swaps the target electronic component with a replacement electronic component by inserting the replacement electronic component into the target position.

12. The apparatus of claim 11, wherein the apparatus further comprises a control system that:

generates, based on processing the first image data, drive system control signals to cause the drive system to propel and position the apparatus;

generates, based on processing the second image data, first gripper apparatus control signals to cause the first gripper apparatus to (i) grip the equipment drawer of the electronics rack and reciprocally extract the equipment drawer from the closed position to the extracted position, and (ii) insert the equipment drawer from the extracted position to the closed position; and generates, based on processing the third image data, second gripper apparatus control signals to cause the second gripper apparatus to grip and remove the target electronic component from the target position located within the equipment drawer.

13. The apparatus of claim 12, wherein the control system is further configured to receive remote control signals from a remote control system.

14. The apparatus of claim 13, further comprising a human machine interface operatively connected to the control system that displays the first, second, or third image data and receives input commands from a human operator of the apparatus.

15. The apparatus of claim 9, wherein the main body further comprises a charging element for interfacing an external charging station to receive electrical supply.

16. The apparatus of claim 9, wherein the drive system comprises a set of drive wheels.

17. The apparatus of claim 9, wherein the target electronic component comprises a hard disk drive (HDD), and wherein the electronics rack comprises a hard disk drive (HDD) storage rack.

18. The apparatus of claim 9, wherein the first side vertical surface includes a removable panel that, when removed, facilitates maintenance access from an exterior space into the height adjustable platform system that is mounted in the interior space.

19. The apparatus of claim 11, wherein the first gripper apparatus comprises mechanisms to unlock the equipment drawer preceding to reciprocally extracting the equipment drawer from the closed position to the extracted position, and lock the equipment drawer subsequent to inserting the equipment drawer from the extracted position to the closed position.

20. The apparatus of claim 11, wherein the second gripper comprises a gantry gripper.

* * * * *